(12) United States Patent
Madour et al.

(10) Patent No.: US 7,043,253 B2
(45) Date of Patent: May 9, 2006

(54) LOAD BALANCING IN A MOBILE TELECOMMUNICATIONS NETWORK

(75) Inventors: Lila Madour, Kirkland (CA); Bobby That Dao Ton, Lachine (CA); Mahmood Hossain, Pointe Claire (CA); Henrik Basilier, San Diego, CA (US); Sanjeevan Sivalingham, San Diego, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 439 days.

(21) Appl. No.: 10/157,141

(22) Filed: May 30, 2002

(65) Prior Publication Data

US 2003/0119519 A1 Jun. 26, 2003

Related U.S. Application Data

(60) Provisional application No. 60/342,089, filed on Dec. 26, 2001.

(51) Int. Cl.
*H04Q 7/20* (2006.01)

(52) U.S. Cl. .................... 455/453; 455/452.1; 455/454

(58) Field of Classification Search ............. 455/452.1, 455/453, 454; 370/401, 352, 338
See application file for complete search history.

(56) References Cited

U.S. PATENT DOCUMENTS

| | | | |
|---|---|---|---|
| 2002/0075823 A1* | 6/2002 | Lee et al. | 370/328 |
| 2003/0017831 A1* | 1/2003 | Lee et al. | 455/453 |
| 2003/0021252 A1* | 1/2003 | Harper et al. | 370/338 |
| 2003/0053465 A1* | 3/2003 | Sivalingham et al. | 370/401 |

\* cited by examiner

*Primary Examiner*—Joseph Feild
*Assistant Examiner*—Huy D. Nguyen
(74) *Attorney, Agent, or Firm*—Sandra Beauchesne; Ericsson Canada Inc.

(57) ABSTRACT

A system, method and node for supporting PDSN load balancing in a CDMA2000 network. A mobile node (MN) sends an origination message to a BSC/PCF that sends a registration request indicating that it supports load balancing according to the invention to the manager part of a PDSN that selects an agent to take care of the connection and redirects the request to it. The agent then validates the request and sends a reply to the BSC/PCF indicating that the initial request has been redirected. The reply also comprises the IP address of the agent. The BSC/PCF then sets up an A10 connection with the agent, and the MN and the agent negotiate a PPP session. There is further a method of setting up a connection between two entities, via a third entity.

14 Claims, 2 Drawing Sheets

LOAD BALANCING IN A MOBILE TELECOMMUNICATIONS NETWORK

PRIORITY STATEMENT UNDER 35 U.S.C. S.119(e) & 37 C.F.R. S.1.78

This non-provisional patent application claims priority based upon the prior U.S. provisional patent application entitled "OPTIMIZED CDMA2000 RAN-PACKET CORE NETWORK (R-P) INTERFACE FOR SUPPORT OF LOAD BALANCING BETWEEN PDSNS", application Ser. No. 60/342,089, filed Dec. 26, 2001, in the names of Lila MADOUR, Bobby That Dao TON, Mahmood HOSSAIN, Henrik BASILIER, and Sanjeevan SIVALINGHAM.

BACKGROUND OF THE INVENTION

1. Field of the Invention

The present invention relates generally to mobile telecommunications, and in particular to load balancing in mobile telecommunications networks.

2. Description of the Related Art

CDMA2000, which will be used as an exemplary network, is a 3G mobile telecommunications standard in which the Packet Core Network (PCN) serves as the cornerstone that provides Internet Protocol (IP) services and mobile IP services to mobile nodes (MNs).

A CDMA2000 network comprises, at least logically, a Home Agent (HA), a Foreign Agent (FA), a Packet Data Serving Node (PDSN), a Packet Core Function (PCF) usually co-located with a Base Station Controller (BSC), and an Authentication, Authorisation and Accounting Server (AAA). The HA provides mobile IP services and keeps track of the MNs association with the network, among other things acting like a router when a MN roams in another network, receiving packets intended for the MN and tunnelling them towards the MN, via a FA in the network where the MN is located. The PDSN acts as a kind of gatekeeper, deciding what MNs are allowed to use services and access the network, while the BSC among other things establishes the traffic channel for the MN to use and the PCF decides which PDSN to send the traffic through.

It is advantageous to allow for load sharing between e.g. PDSNs so that for example one particular PDSN is not overloaded while other PDSNs are nearly idle, if possible. A state of the art solution for providing load balancing among PDSNs is shown in FIG. 1. The telecommunications network 110 comprises a co-located BSC/PCF 112 and a PDSN 113. A mobile node (MN) 11 is physically located within the service area of the network 110, but is not yet served by the network 110.

It should be understood that the structure, or architecture, of a PDSN might vary considerably as it is not defined in any standard. In the example, it will be assumed that the PDSN 113 comprises a manager 114 and a plurality of agents of which only one, agent A 115, is shown. The division of a PDSN into manager and agent can be physical, logical or physical and logical. The manager 114 supervises the agents, keeps track of the sessions associated with each agent, collects information about the load of each agent, performs load balancing, if appropriate, and so on. The agents, among other things, handle user data and accounting, provide load information to the manager 114, and contain the Point-to-Point Protocol (PPP) state machines. It is preferred, but not necessary, to colocate the manager and the agents.

The MN 11 sends an origination message 20 to the BSC/PCF 112 to request packet data service. The BSC/PCF 112 may assign a traffic channel 13 to the MN 11 prior to, or in parallel with, the messages described below. The BSC/PCF 112 performs a PDSN selection, step 12, as is well known in the art, by hashing the International Mobile Subscriber Identity (IMSI)—a unique identity—the MN 11, and then using modulo-(number of possible PDSNs) arithmetic on the result to decide which PDSN to use. Thus, unless the number of possible PDSNs changes, the BSC/PCF 112 will always choose the same PDSN for a given IMSI. In this exemplary scenario, the BSC/PCF 112 chooses the PDSN 113 and sends to it a registration request 121, comprising the International Mobile Subscriber Identity (IMSI) of the MN 11.

At the PDSN 113, the manager 114 receives the registration request 121, and selects which agent to use, step 14. The manager 114 keeps a list of active sessions corresponding to the IMSIs, and uses the list to determine if there already is an active session for the IMSI, and if this is the case chooses the agent associated with the session. If there is no active session for the IMSI, then the manager 114 chooses an agent according to some predetermined scheme, such as for example the agent with the least load. As previously mentioned, the manager 114 is aware of the load on each agent that it directly can forward registration requests to.

When the manager 114 has decided which agent should handle the connection, then it returns to the BSC/PCF 112 a registration reply 122 comprising the code '136', indicating that it returns an alternative PDSN IP address, and the alternative address, i.e. the IP address of the selected PDSN, in this case agent A 115. Note that the BSC/PCF 112 has no way of knowing whether the new address is associated with an entity co-located with the manager 114 or not; the BSC/PCF 112 treats it as a second PDSN, even if it is only a agent, as in this case.

Upon reception of the registration reply 122, the BSC/PCF 112 retrieves code '136' and the alternative IP address. The BSC/PCF 112 has a common security association with the manager 114 and the agents that the manager 114 can use, and uses the security association to compute a MN-HA authentication extension that it includes in a second registration request 123 that is sent to agent A 115.

Agent A 115 validates the registration request 123 upon reception, and, if the request 123 is validated, replies with a second registration reply 124. When the second reply 124 has been received, the MN 11 and agent A 115 negotiate a Point-to-Point Protocol (PPP) session 125.

While the above-mentioned method works well, it is however believed that it can be improved. One such improvement is to reduce the signalling between PDSN and BSC/PCF, thereby decreasing the connection set-up time. It can be appreciated that it would be advantageous to have a solution that provides such an improvement. This invention provides such a solution.

SUMMARY OF THE INVENTION

In one aspect, the present invention is a method for load balancing in a telecommunications network comprising a first node and a second node, wherein the second node logically comprises a manager and a plurality of agents each having its own network address. The first node sends to the manager a request comprising an indication that load balancing is supported. Upon reception of the request, the manager verifies that load balancing is supported, selects an agent, and redirects the request to the selected agent. The selected agent sends to the first node a reply comprising an indication that redirection has been performed and the network address of the agent. Finally, a connection is set up between the first node and the agent.

In another aspect, the present invention is a system for load balancing in a telecommunications network. The system comprises a first node and a second node, wherein the second node logically comprises a manager and a plurality of agents each having its own network address. The manager, upon reception of a request from the first node, verifies that load balancing is supported, selects an agent, and redirects the request to the selected agent. The selected agent sends to the first node a reply comprising an indication that redirection has been performed, and the network address of the agent. The first node sends to the manager the request comprising an indication that load balancing is supported, and upon reception of the reply from the selected agent, sets up a connection between the first node and the selected agent.

In yet another aspect, the present invention is a node for load balancing in a telecommunications network that further comprises a second node. The first node logically comprises a manager and a plurality of agents each having its own network address. The manager receives from the second node a request comprising an indication that the second node supports load balancing, and, upon reception of the request from the second node, verifies that load balancing is supported. The manager then selects an agent and redirects the request to the selected agent. The selected agent sends to the second node a reply comprising an indication that redirection has been performed, and the network address of the agent. Finally the selected agent, together with the second node, sets up a connection with the second node.

In a further aspect, the present invention is a method for setting up a connection between a first network entity and a third network entity via a second network entity, each entity having a network address. The first entity sends to the second entity a request comprising an indication that the first entity supports redirection of the request. The second entity redirects by the request to the third entity, that sends to the first entity a reply comprising an indication that redirection has been performed and the network address of the third entity. Finally a connection is set up between the third entity and the first entity.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION OF THE PREFERRED EMBODIMENTS

Figure 1:
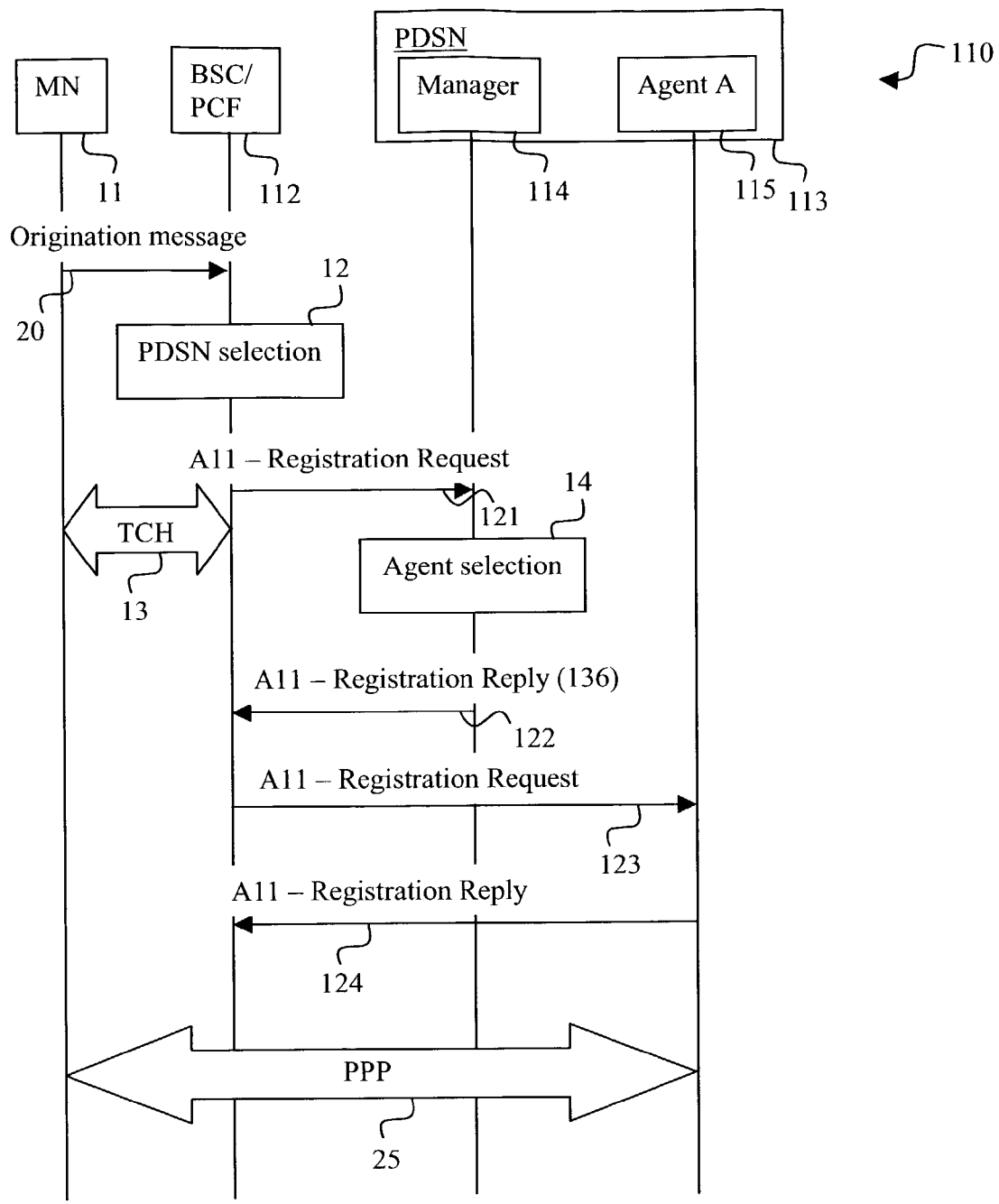
FIG. 1 is a signal flow chart illustrating prior art load sharing.

The innovative teachings of the present invention will be described with particular reference to numerous exemplary embodiments. However, it should be understood that this class of embodiments provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

Figure 2:
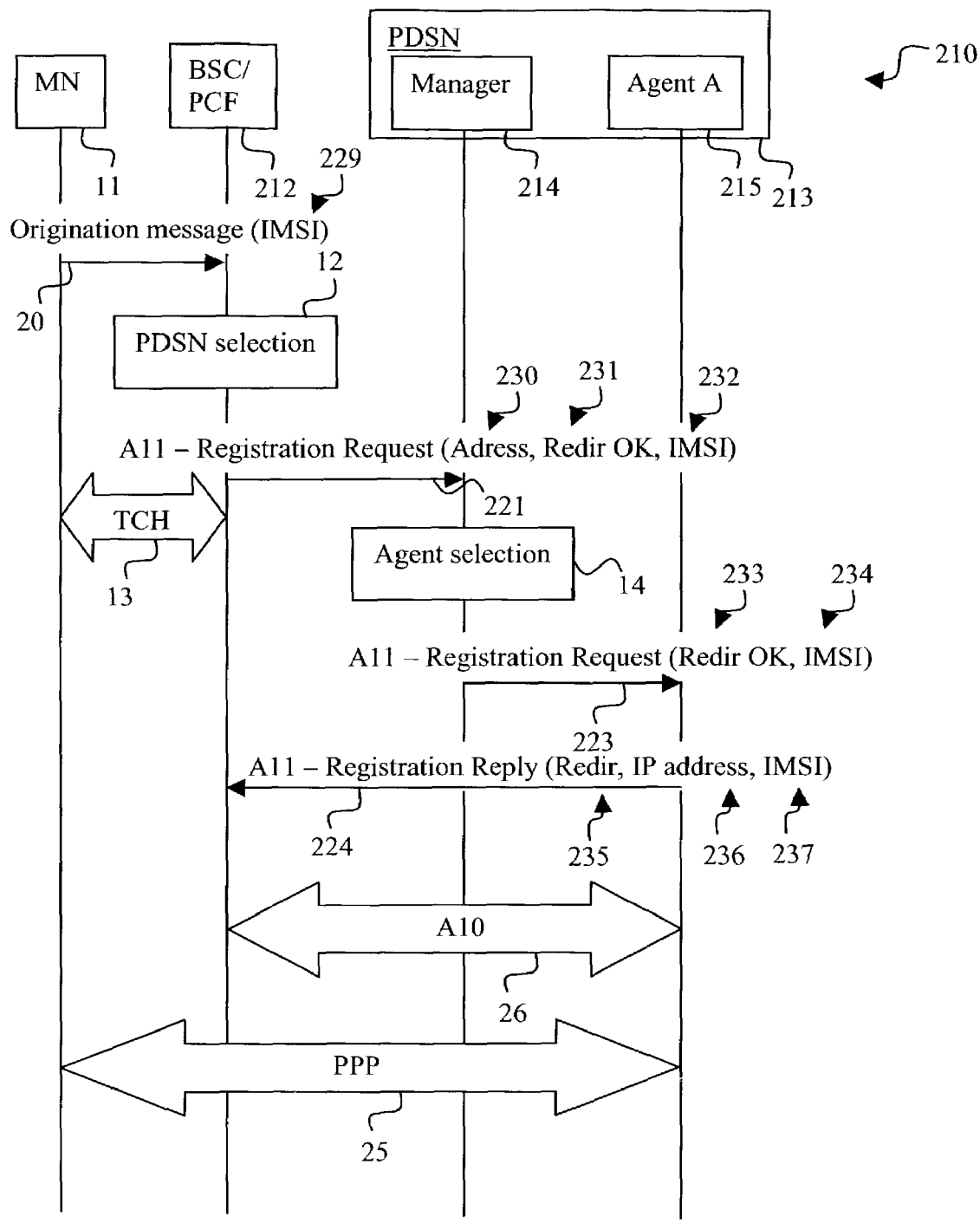
FIG. 2 is a signal flow chart illustrating load sharing according to a preferred embodiment of the invention.

Referring now to FIG. 2 that depicts a flowchart that illustrates load sharing according to a preferred embodiment of the invention. FIG. 2 shows a telecommunications network 210 that comprises a number of network entities: a co-located BSC/PCF 212 and a PDSN 213. A mobile node (MN) 11 is physically located within the service area of the network 210, but is not yet served by the network 210.

The PDSN 213 comprises a manager 214 and a number of agents of which only agent A 215 is shown for clarity. In the PDSN 213, the manager 214 and agent A 215 are co-located, but it should be understood that agent A 215 could be located in another physical node, that may or may not also comprise a second manager (not shown).

The method according to the invention starts out like the prior art method described hereinbefore. The MN 11 sends an origination message 20 comprising a unique identity 229 of the MN 11, such as an International Mobile Subscriber Identity (IMSI) that hereinafter will be used as an example of a unique identity, to the BSC/PCF 212 to request packet data service. The BSC/PCF 212 may assign a traffic channel 13 to the MN 11 prior to, or in parallel with, the steps and messages described hereinafter. The BSC/PCF 212 performs a PDSN selection, step 12.

The method according to the invention now differs from the prior art method in that the BSC/PCF 212 as an example chooses the PDSN 213 and sends to it a registration request 221, comprising the MIP identification, the IMSI 232 of the MN 11 and an indication 231 that the BSC/PCF 212 supports load balancing according to the invention, meaning that it supports redirection of the registration request 221. The request 221 also comprises the network address 230, i.e. the IP address, of the BSC/PCF 212.

At the PDSN 213, the manager 214 receives the registration request 221, and selects which agent to use, step 14. The manager 214 keeps a list of active sessions corresponding to the IMSIs, and uses the list to determine if there already is an active session for the IMSI, and if this is the case chooses the agent associated with the session. If there is no active session for the IMSI, then the manager 214 chooses an agent according to some predetermined scheme, such as for example the agent with the least load. As previously mentioned, the manager 214 is aware of the load on each agent that it directly can forward registration requests to.

When the manager 214 has decided which agent should handle the connection—in this case agent A 215—it verifies whether the BSC/PCF 212 is capable of handling replies from another PDSN, which it, according to the indication 231, is in this exemplary scenario. Note that the BSC/PCF 212 sees agent A 215 as a PDSN, separate from the manager 214. It should be appreciated that the manager 214 also can first verify if the BSC/PCF 212 is capable of handling replies from another PDSN and then choose the agent.

The manager 214 then redirects the registration request 221 to agent A 215 as registration request 223 comprising an indication 233 that the BSC/PCF 212 can handle replies from another PDSN and the IMSI 234 of the MN 11. Upon reception of the request 223, agent A 215 determines from the indication 233 that BSC/PCF 212 supports load balancing according to the invention. Agent A 215 then validates the registration request 223 using the common security association, and, if the request 223 is validated, sends a registration reply 224 to the BSC/PCF 212. The registration reply comprises an indication 235 that the initial registration request 221 has been redirected, the MN-HA authentication extension calculated using the security association, the MIP identification, the IP address 236 of the agent 215 in the Home Agent IP address field, and the IMSI 237 so that the BSC/PCF 212 knows what the reply refers to.

When the reply 224 has been received, the BSC/PCF 212 sets up an A10 connection 26 with agent A 215, and forwards subsequent registration requests for the MN 11 directly to agent A 215. After this, the MN 11 and agent A 215 negotiate a Point-to-Point Protocol (PPP) session 25, i.e. they establish a connection.

While the invention has been described with a co-located manager and agent, it is understood that the location of the agent with regards to the manager may vary according to the needs of a given implementation, and that the agent for example may be located in another node, with or without a second manager. If the agent is not co-located with a manager, then the manager 214 in the first node (the PDSN 213) then the second registration is simply sent over the network 210 instead of inside the PDSN 213. If the agent is co-located with another manager, then the first manager 214 could for example either be allowed to directly contact one or more agents within that PDSN and simply send the second registration request over the network 210 as described hereinbefore, or forward the registration request to the second manager that assigns a suitable agent, which in turn replies to the BSC/PCF 212.

Although the system and method of the present invention have been described in particular reference to certain radio telecommunications messaging standards, it should be realized upon reference hereto that the innovative teachings contained herein are not necessarily limited thereto and may be implemented advantageously with any applicable radio telecommunications standard. It is believed that the operation and construction of the present invention will be apparent from the foregoing description. The method and system shown and described have are provided as exemplary embodiments of the invention, it will be readily apparent that various changes and modifications could be made therein without departing from the scope of the invention as defined by the claims set forth hereinafter.

Although several preferred embodiments of the method and system of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for load balancing in a telecommunications network comprising a mobile node (MN) with a unique identity, a Base Station Controller/Packet Core Function (BSC/PCF) and a Packet Data Serving Node (PDSN), wherein the PDSN logically comprises a manager and a plurality of agents each having its own network address, the method comprising the steps of:
    sending from the BSC/PCF to the manager a request comprising an indication that load balancing is supported;
    upon reception of the request, verifying by the manager that load balancing is supported;
    selecting by the manager an agent;
    verifying if the unique identity of the MN is associated with an agent;
    if this is the case:
        selecting that agent;
    if the unique identity is not associated with any agent:
        selecting an agent with the least load;
    redirecting by the manager the request to the selected agent;
    sending from the selected agent to the BSC/PCF a reply comprising an indication that redirection has been performed and the network address of the agent; and
    setting up a connection between the BSC/PCF and the agent.

2. The method of claim 1, wherein the method further comprises, prior to the step of sending from the BSC/PCF to the manager a request comprising an indication that load balancing is supported, the step of:
    sending from the MN to the BSC/PCF a message comprising the unique identity of the MN; and
    wherein the step of sending from the BSC/PCF to the manager a request comprising an indication that load balancing is supported is performed upon reception of the message.

3. The method of claim 2, wherein:
    the request sent from the BSC/PCF to the manager further comprises the unique identity of the MN.

4. The method of claim 3, wherein the telecommunications network is a cdma2000 network, the message is an origination message, the request is an A11 registration request, the unique identity is an International Mobile Subscriber Identity, the reply is an A11 registration reply, the network addresses are IP addresses, the connection between the BSC/PCF and the agent is an A10 connection, and the connection between the MN and the agent is a Point-to-Point Protocol session.

5. The method of claim 2, further comprising the step of:
    establishing a connection between the MN and the agent.

6. A system for load balancing in a telecommunications network, the system comprising a MN with a unique identity, and a Base Station Controller/Packet Core Function (BSC/PCF) and a Packet Data Serving Node (PDSN), wherein the PDSN logically comprises a manager and a plurality of agents each having its own network address, wherein:
    the manager;
    upon reception of a request from the BSC/PCF, verifies that load balancing is supported;
    selects an agent; and
    verifies if the unique identity is associated with an agent;
    if this is the case, selects that agent
    if the unique identity is not associated with any agent, selects the agent with the least load;
    redirects the request to the selected agent;
    the selected agent;
    sends to the BSC/PCF a reply comprising:
    an indication that redirection has been performed;
    the network address of the agent;
    the BSC/PCF;
    sends to the manager the request comprising an indication that load balancing is supported; and
    upon reception of the reply from the selected agent, sets up a connection between the BSC/PCF and the selected agent.

7. The system of claim 6, wherein the BSC/PCF further, prior to sending to the manager a request comprising an indication that load balancing is supported:
    receives from the MN a message comprising the unique identity of the MN.

8. The system of claim 7, wherein:
    the request sent from the BSC/PCF to the manager further comprises the unique identity of the MN.

9. The system of claim 8, wherein the telecommunications network is a cdma2000 network, the message is an origination message, the request is an A11 registration request, the unique identity is an International Mobile Subscriber Identity, the reply is an A11 registration reply, the network addresses are IP addresses, the connection between the BSC/PCF and the agent is an A10 connection, and the connection between the MN and the agent is a Point-to-Point Protocol session.

10. The system of claim 7, wherein the agent further, in co-operation with the MN:
   establishes a connection with the MN.

11. A Packet Data Serving Node (PDSN) for load balancing in a telecommunications network that comprises a manager and a plurality of agents each having its own network address, wherein:
   the manager;
   receives from a Base Station Controller/Packet Core Function (BSC/PCF) a request comprising an indication that load balancing is supported by the PDSN;
   upon reception of the request from the PDSN, verifies that load balancing is supported;
   selects an agent; and
      redirects the request to the selected agent;
      verifies if a unique identity of a Mobile Node (MN) is associated with an agent, wherein the MN is in communication with the BSC/PCF;
      if this is the case, selects that agent; and
      if the unique identity is not associated with any agent, selects the agent with the least load;
   the selected agent;
   sends to the PDSN a reply comprising:
   an indication that redirection has been performed; and
   the network address of the agent; and
   together with the PDSN sets up a connection with the PDSN.

12. The node of claim 11, wherein the network further comprises a MN with a unique identity that is known to the PDSN, wherein:
   the request sent from the PDSN to the manager further comprises the unique identity of a MN.

13. The node of claim 12, wherein the agent further, in co-operation with the MN:
   establishes a connection with the MN.

14. The node of claim 12, wherein the telecommunications network is a cdma2000 network, the message is an origination message, the request is an A11 registration request, the unique identity is an International Mobile Subscriber Identity, the reply is an A11 registration reply, the network addresses are IP addresses, the connection between the BSC/PCF and the agent is an A10 connection, and the connection between the MN and the agent is a Point-to-Point Protocol session.

* * * * *